UNITED STATES PATENT OFFICE.

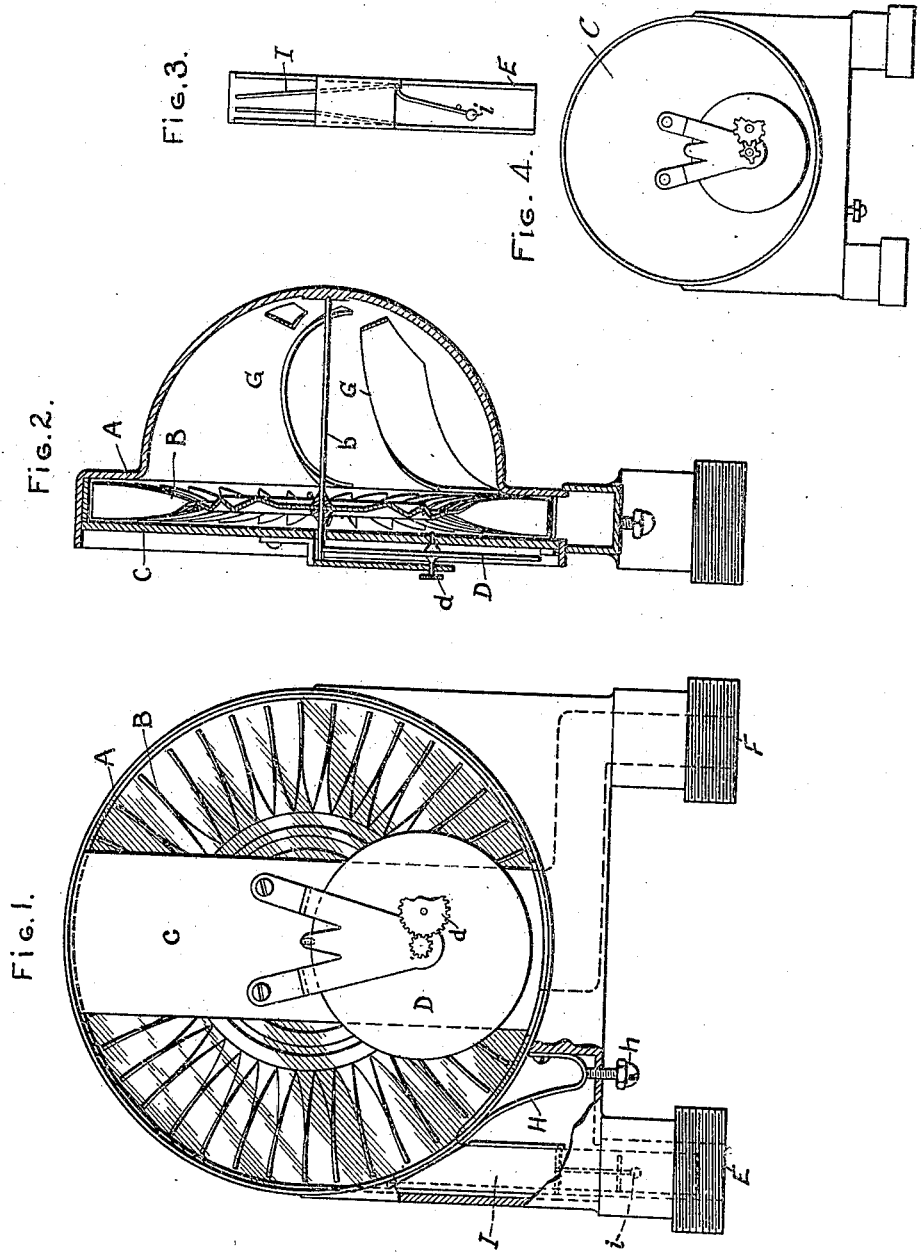
E. S. HALSEY.
GAS METER.
APPLICATION FILED JAN. 23, 1907.
952,110.
Patented Mar. 15, 1910.
Witnesses
Irving E. Steers.
J. Ellis Glen.
Inventor
Edward S. Halsey.
by Albert G. Davis
Atty.

EDWARD S. HALSEY, OF LYNN, MASSACHUSETTS, ASSIGNOR TO GENERAL ELECTRIC COMPANY, A CORPORATION OF NEW YORK.

GAS-METER.

952,110.   Specification of Letters Patent.   Patented Mar. 15, 1910.

Application filed January 23, 1907. Serial No. 353,636.

*To all whom it may concern:*

Be it known that I, EDWARD S. HALSEY, a citizen of the United States, residing at Lynn, county of Essex, State of Massachusetts, have invented certain new and useful Improvements in Gas-Meters, of which the following is a specification.

My invention relates to gas meters, and its object is to provide a meter of improved construction.

To this end my invention comprises a number of novel features, one of which consists in the arrangement for transmitting the movement of the paddle-wheel, driven by the fluid passing through the motor, to the required mechanism with a minimum of friction.

By my invention I provide a rotatable disk, supporting one end of the shaft of the paddle-wheel, and driven by the rolling friction of the shaft, and I arrange the bearing for the other end of the shaft at a comparatively great distance from the wheel, so that nearly all the weight of the wheel is carried by the disk.

My invention further comprises an arrangement of the vanes or paddles of the wheel and of the chamber in which it is mounted, such that the flow of idle gas and the loss due to eddy currents are reduced to a minimum; and such that the wheel is not carried on by the momentum of the gas when the flow through the meter is suddenly reduced.

My invention further comprises an arrangement of inlet and outlet such that it is impossible to reverse the rotation of the meter by fraudulently producing a reverse flow through the meter, as by blowing in through the outlet.

The various features comprised in my invention will best be understood by reference to the accompanying drawings, in which—

Figure 1 shows a front elevation of a meter arranged in accordance with my invention; Fig. 2 shows a side elevation; Fig. 3 shows a detail of construction; and Fig. 4 shows on a smaller scale a front view of the meter with a modified form of construction.

In the drawings, A represents the inclosing chamber, in which is the rotatably mounted paddle-wheel B. The shaft $b$ of the wheel extends through a slot in a plate C. This slot does not support the weight of the shaft, but acts only to provide a lateral bearing for the shaft. The plate C is close to the wheel and may be circular as is shown in Fig. 4 so as to serve as the entire front wall for the wheel chamber, or may form only a portion of the wall, as shown in Fig. 1, the ends of the wall being formed by segments of glass permitting inspection of the wheel chamber. The front end of the shaft is supported on a disk D, which is rotatably mounted and connected in any suitable manner to any suitable recording mechanism indicated by the small gear-wheel $d$ in Fig. 1. The disk D is driven by the rolling friction of the shaft $b$. The casing A on the back side of the wheel is extended to form a dome or chamber, and the back end of the shaft $b$ is supported in the side of this dome. This support is comparatively remote from the wheel, so that the greater part of the weight of the wheel is carried by the disk D, and is employed effectively for transmitting the motion of the wheel to the disk by rolling friction.

E and F represent the inlet and outlet pipes, respectively. The inlet E is arranged tangentially to the paddle-wheel, so that the inflowing gas produces its maximum effect on the wheel. The inner portions of the paddles or vanes of the wheel, which do not directly receive the incoming gas, are twisted so as to deflect a portion of the gas into the dome back of the wheel. In this dome are mounted baffle-plates G, which extend close to the wheel, and which serve to reduce the flow of idle gas, to prevent losses in eddy currents, and to prevent the momentum of the gas from carrying the wheel on when the flow is suddenly reduced. The outlet from the wheel chamber is radial for a short distance, as shown in dotted lines in Fig. 1, but bends in a tangential direction, so that the direction of flow of gas through the outlet has a tangential component. With gas flowing through the meter at its normal rate, this tangential component has no practical effect; but if the consumer should blow in through the outlet in a fraudulent attempt to rotate the meter in its reverse direction, because of the arrangement of the outlet, he would simply rotate the meter farther in its normal direction.

H represents a spring-plate controlled by the screw $h$ for varying the inlet opening, and so adjusting the recording rate of the meter. After adjustment the screw $h$ should be sealed.

In order to compensate for starting friction, I provide the arrangement shown in Fig. 3. In the inlet is mounted a pivoted vane I, which, when no gas is flowing, is held in the position shown by the weight $i$, thereby providing only a restricted passage for the flow of gas. Consequently, when the flow of gas first begins, the gas enters the meter with a high velocity, due to this restricted opening, so as to overcome the starting friction of the meter. As soon as the flow has been established, the pressure of the entering gas presses back the vane I, so as to enlarge the opening.

What I claim as new, and desire to secure by Letters Patent of the United States, is,—

1. In a fluid meter, a casing having inlet and outlet for the fluid, a paddle-wheel in said casing adapted to be rotated by the flow of fluid through the casing, a horizontal shaft for said wheel, a disk close to said wheel supporting one end of said shaft and driven by the rolling friction of said shaft, and a bearing for the other end of said shaft comparatively remote from the wheel, whereby said disk receives the greater part of the weight of said wheel.

2. In a fluid meter, a casing having inlet and outlet for the fluid, a paddle-wheel in said casing adapted to be rotated by the flow of fluid through the casing, a horizontal shaft for said wheel, a disk close to said wheel supporting one end of said shaft and driven by the rolling friction of said shaft, a dome or chamber on the other side of said wheel, baffle-plates mounted in said dome, and a bearing for the other end of said shaft in the side of the dome remote from said wheel.

3. In a fluid meter, a casing, a paddle-wheel rotatably mounted therein, a fluid inlet tangential to the wheel, a dome or chamber at one side of said wheel, baffle-plates in said dome, and a fluid outlet radial to said wheel, said outlet having a bend in a tangential direction whereby the direction of flow through said outlet has a tangential component.

4. In a fluid meter, a casing, a paddle-wheel rotatably mounted therein, a fluid inlet tangential to said wheel, a dome or chamber to one side of said wheel, the inner portion of the paddle-wheels being twisted to deflect a portion of the entering fluid into said dome, baffle-plates in said dome, and a fluid outlet radial to said wheel.

5. In a fluid meter, a casing, a paddle-wheel rotatably mounted therein, a fluid inlet tangential to said wheel, a dome or chamber to one side of said wheel, the inner portion of the wheel paddles being twisted to deflect a portion of the entering fluid into said dome, baffle-plates in said dome, and a fluid outlet radial to said wheel, said outlet having a bend in a tangential direction whereby the direction of fluid flow through said radial outlet has a tangential component.

6. In a fluid meter, a casing, a paddle-wheel rotatably mounted therein, a fluid inlet tangential to said wheel, and a fluid outlet radial to said wheel, said outlet having a tangential bend whereby the direction of flow through said outlet has a tangential component.

In witness whereof, I have hereunto set my hand this twenty-first day of January, 1907.

EDWARD S. HALSEY.

Witnesses:
 JOHN A. MCMANUS, Jr.,
 PHILIP F. HARRINGTON.